(12) United States Patent
Nakanishi et al.

(10) Patent No.: US 7,325,984 B2
(45) Date of Patent: Feb. 5, 2008

(54) OPTICAL SUBASSEMBLY ENHANCING WIGGLE TOLERANCE AND A METHOD FOR MANUFACTURING THE SAME

(75) Inventors: Hiromi Nakanishi, Yokohama (JP); Kenji Hirayama, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/402,271

(22) Filed: Apr. 12, 2006

(65) Prior Publication Data
US 2006/0275001 A1    Dec. 7, 2006

(30) Foreign Application Priority Data
Apr. 13, 2005    (JP)    ............ P. 2005-116143

(51) Int. Cl.
*G02B 6/36* (2006.01)
(52) U.S. Cl. ................ 385/93; 385/53; 385/88; 385/92
(58) Field of Classification Search .......... 385/53, 385/88, 92, 93
See application file for complete search history.

(56) References Cited

U.S. PATENT DOCUMENTS 6,595,701 B2 *    7/2003    Terada et al. ............ 385/93
2005/0036745 A1 *    2/2005    Nakanishi et al. ........ 385/88

FOREIGN PATENT DOCUMENTS

JP    01-207709    8/1989
JP    2003-241025    8/2003

* cited by examiner

*Primary Examiner*—Jennifer Doan
(74) *Attorney, Agent, or Firm*—Smith, Gambrell & Russell, LLP

(57) ABSTRACT

The present invention provides an optical subassembly that reduces the fluctuation of the optical power due to an external force applied via the optical connector mated with the subassembly. The subassembly provides an optical device, a stub and a joint sleeve. The optical device includes a laser diode (LD), a stem, a lens cap, and a lens. The interval between the optical device and the lens is set greater than a reference interval and the focal length of the lens. The reference interval is set such that, when the interval between the LD and the lens and the interval between the lens and the stub are varied to achieve the maximum optical coupling therebetween at the reference interval between the LD and the lens.

17 Claims, 11 Drawing Sheets

OPTICAL SUBASSEMBLY ENHANCING WIGGLE TOLERANCE AND A METHOD FOR MANUFACTURING THE SAME

BACKGROUND OF THE INVENTION

1. Field of the Invention

The present invention relates to an optical subassembly and a method for manufacturing the subassembly.

2. Related Prior Art

Japanese patent application published as JP-H01-207709A has disclosed a transmitting optical subassembly (TOSA). This TOSA comprises a single mode optical fiber, a laser diode (LD), and an optical lens arranged between the optical fiber and the LD. In this TOSA, the single mode optical fiber in a tip thereof positions in a side opposite to the least circle of confusion with respect to a center of a Gaussian mirror surface formed by this lens.

Another Japanese patent application published as JP-2003-241025A has disclosed a TOSA with an optical receptacle configuration that includes a stub.

Such conventional TOSAs generally provide an LD, a lens, a lens cap and a stem. Further, a conventional method for manufacturing the TOSA typically includes a step for setting a distance between the LD and lens where, in an optical system including the LD, the lens and the stub, a maximum optical coupling efficiency therebetween may be achieved, and step for setting a distance between the lens and an optical fiber, which is included within the stub, where a specific output power smaller than the maximum available power is given. That is, the stub is fixed in a point apart from a position where the maximum optical power is obtained; generally, the stub in an end surface thereof is defocused from the lens.

This method mentioned above may bring the following advantages; (1) an alignment tolerance along directions, X and Y, perpendicular to an optical axis may be widened when respective optical elements are fixed to each other because the stub is defocused, and (2) various output power may be obtained only by one type of the TOSA. Thus, after the LD is positioned with respect to the lens such that the maximum optical power is obtained and the stub is adjusted in its position such that the target optical power is obtained, a defocused amount of the stub is widened to expand the tolerance for the misalignment along the optical axis, which brings an advantage in the YAG laser welding for optical elements.

The TOSA carries an optical signal into the optical fiber by mating the receptacle thereof with an optical connector installed in a tip of the optical fiber. However, a fluctuation of the optical power is sometimes observed within the optical fiber. This fluctuation closely relates to a power distribution at an end surface of the stub. The present invention, in view of this phenomenon, provides a TOSA that may reduce the power fluctuation due to an external force applied to the optical connector through the optical fiber, and provides a method for manufacturing the TOSA.

SUMMARY OF THE INVENTION

One aspect of the present invention relates to an optical arrangement of an optical subassembly that comprises an optical receptacle, an optical device, and a joint sleeve. The optical receptacle secures a stub optically coupled with an external connector and provides a coupling fiber in a center portion of the stub. The optical device includes a semiconductor optical device, such as semiconductor laser diode, and a stem for mounting the semiconductor optical device, and a lens cap that secures a lens to couple the semiconductor laser diode in optical with the coupling fiber within the stub. The joint sleeve aligns the optical receptacle in optical with the optical device. In the present optical subassembly, a distance between the semiconductor optical device and the lens is set greater than not only a reference distance where maximum optical coupling efficiency between the semiconductor optical device and the lens is achieved but also a focal length of the lens.

Moreover, a ratio of the distance between the semiconductor optical device and the lens to a distance between the lens and the coupling fiber is preferably to be greater than unity to obtain a significant optical output power at an end surface of the stub opposite to the lens. Further, the semiconductor optical device is preferably defocused to the lens at least 20 µm greater than the reference distance.

According to the above optical configuration for the optical subassembly, a defocused amount for a distance between the lens and the coupling fiber to get a specific output power from the optical subassembly may be reduced. Accordingly, the power distribution at the end surface of the stub facing the lens may be decreased, and the wiggle tolerance of the optical subassembly may be enhanced.

Another aspect of the present invention relates to a method for manufacturing an optical subassembly. The method comprises steps of; (a) mounting the semiconductor optical device in a position on the stem offset from the position where the maximum optical coupling between the semiconductor optical device and the lens is achieved, (b) assembling the lens cap with the stem, (c) optically aligning the optical receptacle with the optical device along two directions perpendicular to the optical axis of the coupling fiber, and (d) optically aligning the optical receptacle with the optical device in a direction parallel to the optical axis by sliding the joint sleeve on the lens cap such that the optical output power emitted from the end surface of the coupling fiber opposite to one facing the lens becomes a preset power.

The lens is preferably a spherical lens, while the semiconductor optical device may be a semiconductor laser diode with an active layer for emitting light. Moreover, the step (b) may further include a step for offsetting a center of the spherical lens from a virtual plan including the active layer of the laser diode. The end surface of the stub facing the lens may be inclined to the optical axis of the coupling fiber and the step (c) may further include a step for aligning the inclined surface of the stub to a direction where the lens is offset from the virtual plane by rotating the optical receptacle on the joint sleeve.

Thus, according to the method for manufacturing the optical subassembly, first the semiconductor optical device is mounted at a position on the stem offset from the position where the maximum optical coupling efficiency is achieved between the semiconductor optical device and the lens. Accordingly, a defocused amount for the coupling fiber to get a specific output power may be reduced. The power distribution at the end surface of the stub facing the lens may be decreased, thereby enhancing the wiggle tolerance of the optical subassembly.

DESCRIPTION OF PREFERRED EMBODIMENTS

The present invention may be easily understood by taking the specification into consideration as referring to accompanying drawings. Next, an optical subassembly of the present invention and a method for manufacturing it will be described. In the description below, same numerals or symbols will refer to the same elements without overlapping explanations.

First Embodiment

Figure 1:
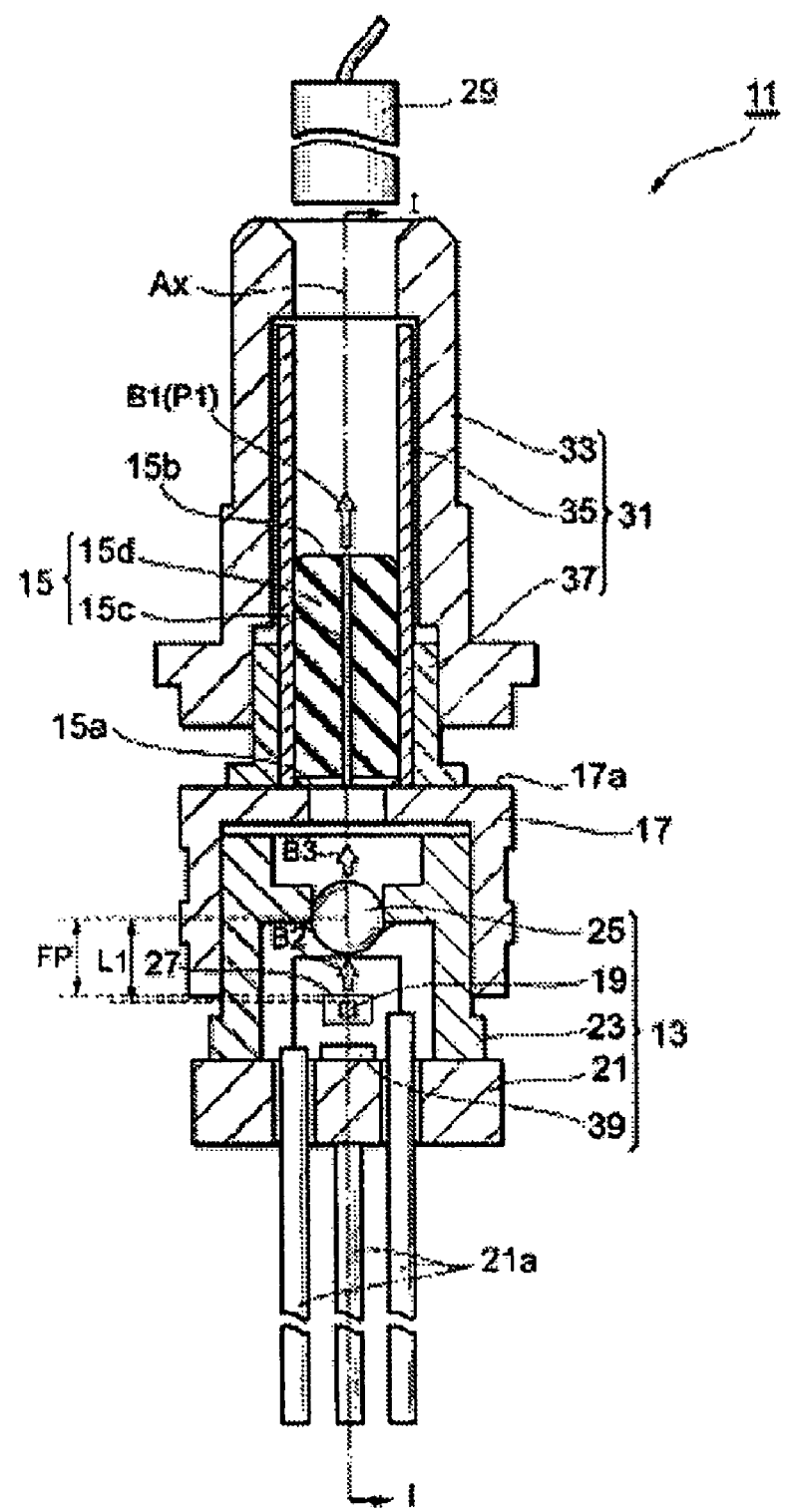
FIG. 1 is a cross section of the TOSA according to the first embodiment of the present invention.

FIG. 1 is a side cross section of a transmitting optical subassembly (TOSA) 11 according to the first embodiment of the invention. The TOSA 11 comprises an optical device 13, a stub 15, and a joint sleeve 17. The optical device 13 includes a laser diode (LD) 19, as a semiconductor optical device, a stem 21, a lens cap 23, and a lens 25. The stem 21 mounts the LD 19 via a sub-mount 27. The lens cap 23 secures the lens 25, while, it is fixed to the stem 21 to form a cavity, within which the LD 19 is installed. The stub 15 is held within an optical receptacle 31 that receives an optical connector, specifically, to receive an optical ferrule provided in the optical connector.

The joint sleeve 17 covers an end portion of the optical device 13, while, it mounts the receptacle 31 on the end surface thereof. The joint sleeve 17 aligns the receptacle 31 with respect to the optical device 13 to couple the LD 19 in optical with an end surface 15a, a rear end, of the stub 15. The stub 15 includes a coupling fiber 15c and a support member 15d. In the present TOSA 11, as explained later, a distance L1 between the LD 19 and the lens 25 is greater than a reference distance L0, moreover, the distance L1 is also greater than a focal length FP of the lens 25. The reference distance L0 may be determined such that, varying the distance L1 between the LD 19 and the lens 25, and, at the same time, between the lens 25 and the stub 15, the output power P1 of the LD 19 monitored after passing the lens 25 and the stub 15 becomes a maximum at the reference distance L0

Figure 2A:
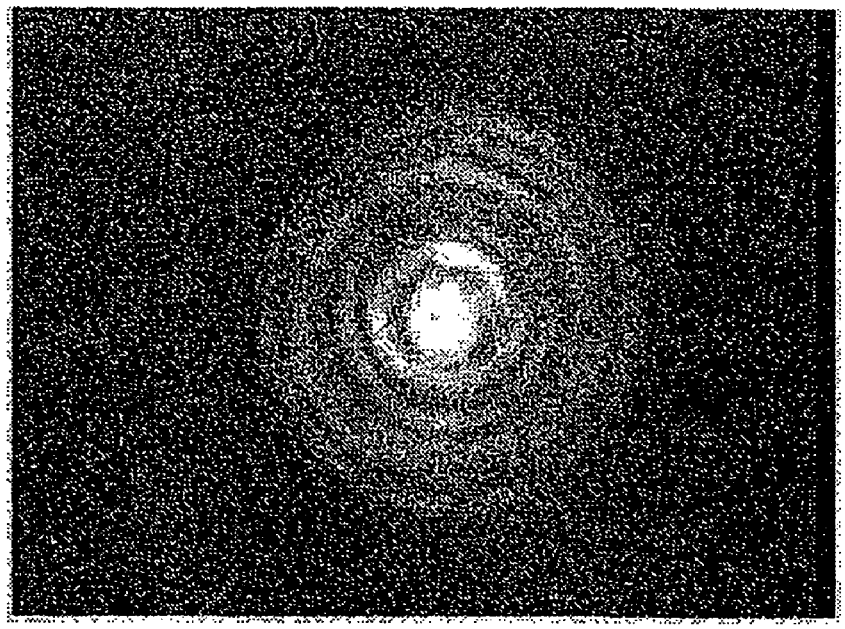
FIG. 2A shows a distribution of the optical power within the optical fiber by the present TOSA.
Figure 2B:
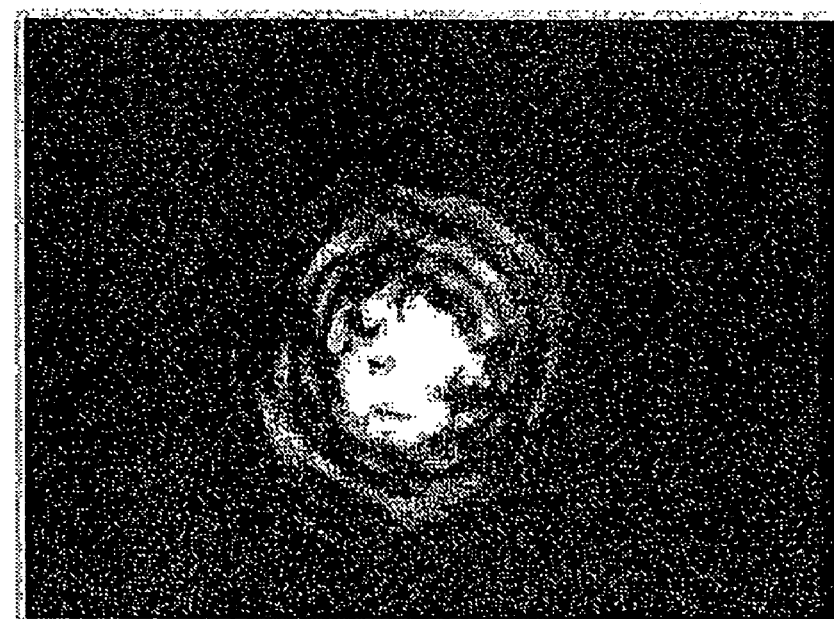
FIG. 2B is a distribution of the optical power by the conventional TOSA.

Regarding to a power fluctuation of the light emitted from the TOSA 11 will be described as referring to FIGS. 2A and 2B. FIG. 2A shows a power distribution of the optical output from the TOSA 11 of the present invention, while, FIG. 2B shows the power distribution of the optical output from another subassembly prepared for comparing to the present TOSA 11. These power distributions in FIGS. 2A and 2B are observed at the front end 15b of the stub 15. In the conventional TOSA, the distance between the LD and the lens 25 is decided so as to show the maximum optical coupling efficiency in the system including the LD 19, the lens 25, and the stub 15. Moreover, when the stub 15 is permanently fixed, the stub 15 positions apart from a point where the maximum optical coupling efficiency is achieved to get the specific output power smaller than the maximum power. Comparing patterns shown in FIGS. 2A and 2B, it may be easily understood that the pattern in FIG. 2B more fluctuates than that shown in FIG. 2A at the front end of the stub and FIG. 2A shows a superior symmetry compared to that shown in FIG. 2B.

Figure 3A:
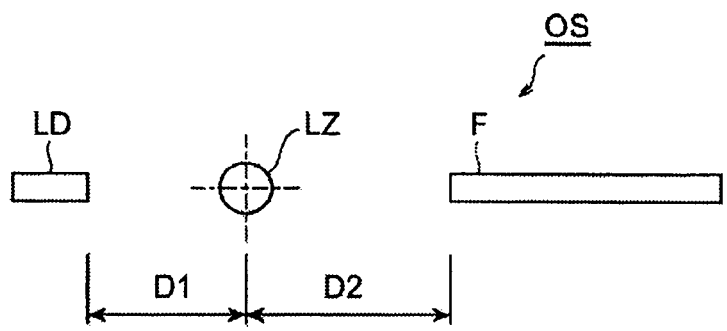
FIG. 3A is a schematic diagram of a setup for the present experiment.

Next, the reference distance L0 will be described as referring to FIGS. from 3A to 3C. FIG. 3A shows an experimental setup OS, which includes the LD, a spherical lens LZ, and a single mode fiber F. A symbol D1 denotes a distance between the LD and the center of the spherical lens LZ, while another symbol D2 denotes a distance between the center of the lens LZ and a tip of the single mode fiber F. The end surface of the optical fiber F is not inclined with respect to the optical axis thereof. The optical system OS shown in FIG. 3A has configurations listed in the next table:

TABLE

| Experimental setup | |
|---|---|
| emission angle of the LD | 25° |
| emission diameter of the LD | 1 μm |
| refractive index of the lens LZ | 1.8 |
| diameter of the lens LZ | 0.8 mm |
| focal length FP of the lens LZ | 0.45 mm |
| numerical aperture NA of the fiber F | 0.1 |
| core diameter of the fiber F | 10 μm |

Figure 3B:
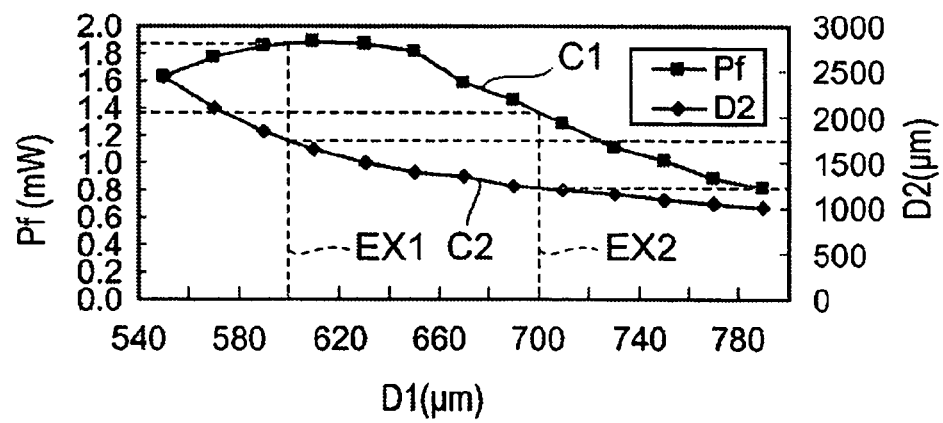
FIG. 3B shows a relation between the optical output power and a distance D1 between the LD and the lens.
Figure 3C:
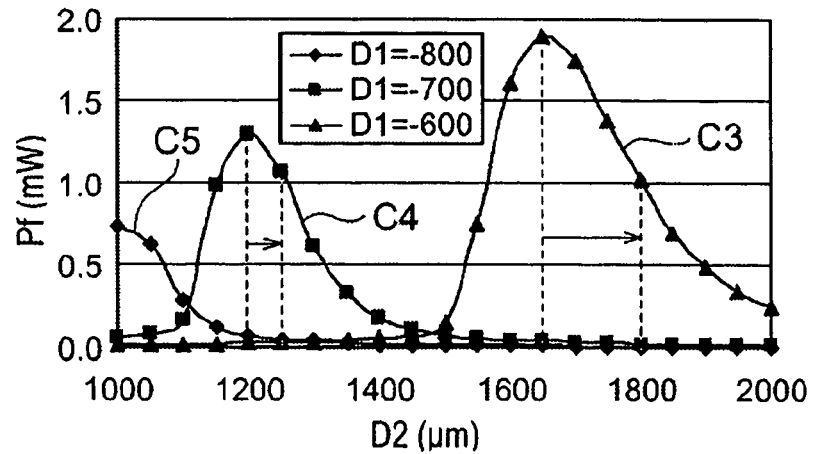
FIG. 3C shows a relation between the optical output power and a distance D2 between the lens and the stub.

FIG. 3B shows behaviors of the optical power Pf output from the fiber F against the distance D1. A behavior C1 corresponds to the maximum optical power Pf when the distance D2 is varied as the distance D1 is kept constant, while a behavior C2 corresponds to the distance D2 when the maximum output power Pf is obtained at the distance D1 fixed to a value shown in the horizontal axis. FIG. 3C shows relations of the output power Pf against the distance D2. Behaviors from C3 to C5 correspond to the optical output as varying the distance D2 when the distance D1 is fixed to 800 μm, 700 μm, and 600 μm, respectively.

For the condition EX1 in FIG. 3B where the LD emits light with an output power of 5 mW and two distances are D1=600 μm and the distance D2=1650 μm, respectively, the output power from the fiber F becomes 1.89 mW, in which the maximum coupling efficiency is 37.8%. Under this condition, the distance D1 between the LD and the lens LZ coincides with the reference distance L0. As shown in FIG. 3C, in order to get an output power of 1 mW, the distance D2 is necessary to be increased to get the target output power, 1 mW. Accordingly, the fiber F is necessary to be further apart by 150 μm from the lens LZ to set the distance between the lens LZ and the tip of the optical fiber F to be 1800 μm.

On the other hand, another condition EX2 has a configuration that the distance D1 between the LD and lens LZ is set to 700 μm, which is greater than the former condition, D1=600 μm, where the maximum optical coupling is obtained. Under this condition, EX2, the maximum output power may be obtained when the distance D2 between the lens and the fiber is set to be 1200 μm. A practical value of the output power becomes 1.3 mW. The condition that D1=700 μm between the LD and the lens LZ is greater than both the reference distance LO and the focal length 450 μm of the lens LZ. Moreover, the power distribution under the condition EX2 shows a smaller and a homogeneous fluctuation compared to that observed under the condition EX1. To get the target output power, 1 mW, under the condition EX2, the optical fiber F is necessary to be apart only by 50 μm from the position, D2=1200 μm, where the maximum optical output power is obtained.

Comparing to a conventional TOSA, where the distance between the LD and the lens is adjusted so as to give the maximum optical coupling efficiency, the present TOSA decreases the optical power entering the lens because the distance between the facet of the LD and the primary surface of the lens is greater than the reference distance. However, according to the present TOSA, the fluctuation in the output power at the end surface of the stub may be reduced. Accordingly, the variation of the optical coupling efficiency when an external force is applied to the optical fiber, what we call the wiggle characteristic, may be reduced.

Referring to FIG. 1 again, the structure of the TOSA 11 will be described. The optical receptacle 31 includes the stub 15, a sleeve cover 33, a sleeve 35 and a bush 37. The stub 15 is positioned within the sleeve 35, while, the sleeve 35 is secured by the sleeve cover 33 via the bush 37. The optical receptacle 31 is mounted on an end surface 17a of the joint sleeve 17. On the stem 21 is installed with a photodiode (PD) 39 for monitoring the output power of the light emitted from the LD 19. The LD 19 and the PD 39 are electrically connected to respective lead terminals 21a. The LD 19 generates an optical signal B2 by responding a driving signal supplied via the lead terminal 21a. A portion of the optical signal B2 enters the lens 25. An optical signal B3, outgoing from the lens, enters the tip 15a of the stub 15, while, an optical signal B1 with less fluctuation in the power distribution of the optical output from the other end 15b of the stub 15.

Figure 4A:
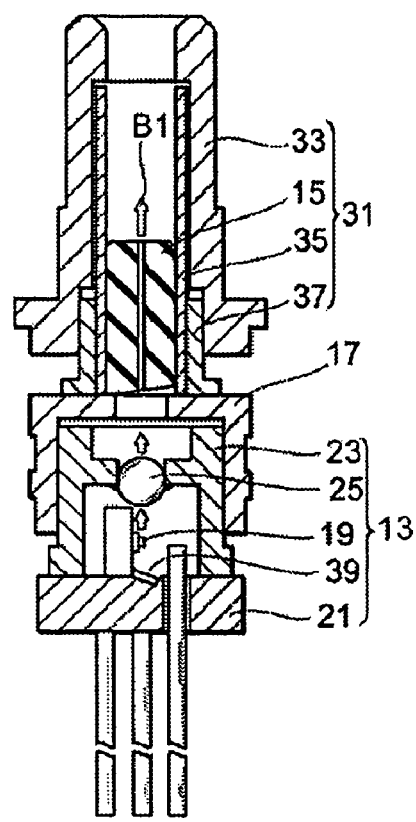
FIG. 4A is a cross section taken along the line I-I in FIG. 1.
Figure 4B:
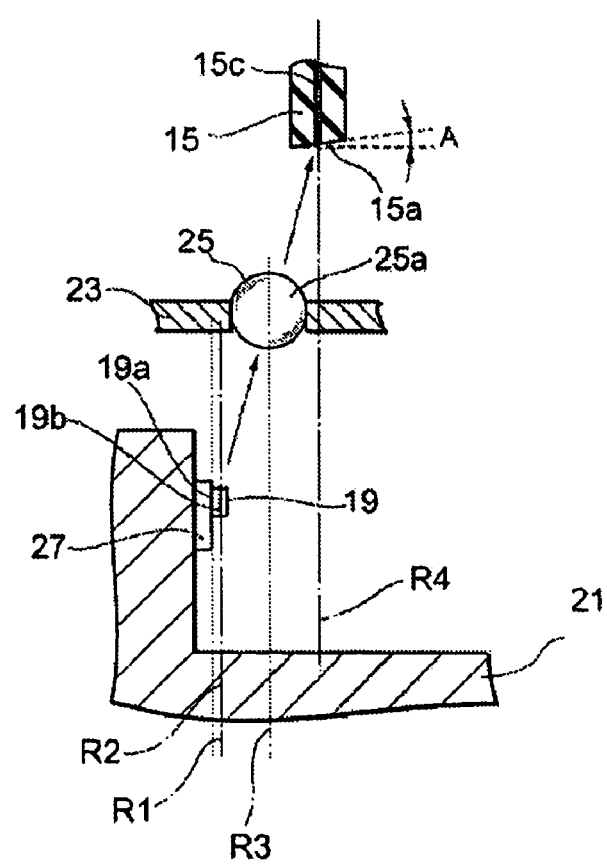
FIG. 4B shows a positional relation between the lens and the stub.

FIG. 4A is a cross sectional view taken along the line I-I in FIG. 1. The TOSA 11 shown in FIG. 4A rotates by 90° from a position shown in FIG. 1. FIG. 4B shows a positional relation between the LD 19, the lens 25, and the stub 15.

The lens 25 is preferably a spherical lens. The LD 19 has a bonding surface 19a facing the sub-mount 27, which extends along a virtual reference plane R1. The LD 19 also provides an active layer 19b, which extends along another virtual reference planer R2 in parallel to the reference planer R1. The center 25a of the lens 25 locates within a third reference plane R3 also in parallel to the first R1 and second R2 virtual reference planes. Further, the center of the coupling fiber 15c, namely, the core of the coupling fiber 15c within the stub 15 locates in a fourth virtual reference plane R4 in parallel to first to third virtual reference planes, R1 to R3. AS shown in FIG. 4B, first to fourth reference planes, R1 to R4, are arranged in this order along a direction. The end surface 15a of the stub 15 is inclined to this direction. The angle A of the inclined end surface 15a of the stub 15 is preferably between 5° and 9°. The distance between the first and third planes, R1 and R3, is greater than 20 μm, preferably, greater than 60 μm. This distance may be formed by offsetting the lens cap 23 assembled with the stem 21.

Figure 5:
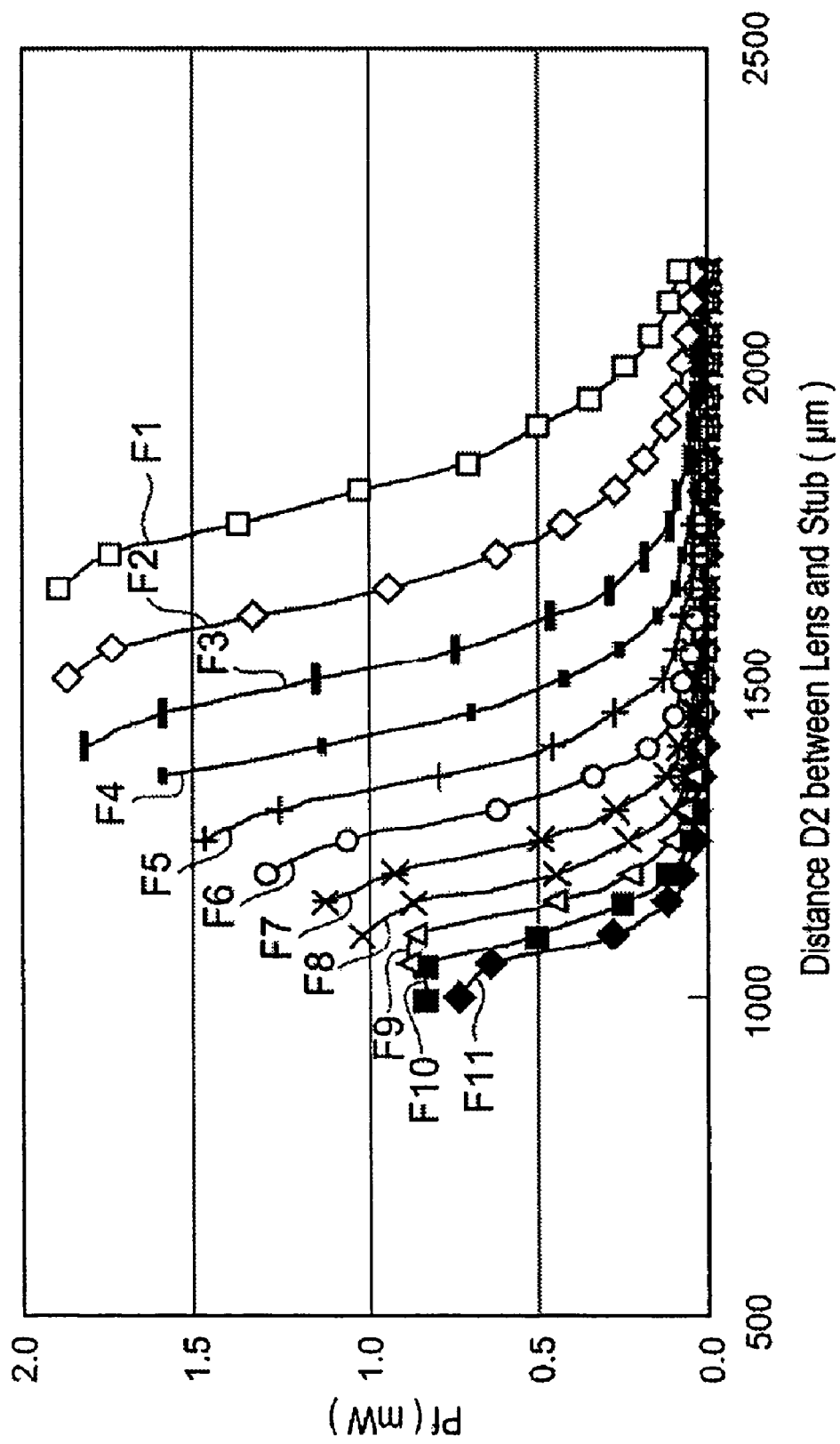
FIG. 5 shows a relation between the optical output power at the end surface of the stub and the distance D2.

FIG. 5 shows a relation of the output power at the end surface 15a of the stub 15 to the distance D2. In FIG. 5, the distance D2 increases as defocusing from a position where the maximum optical coupling efficiency is given. That is, the output power at the end surface 15a of the stub 15 may be decreased by this defocusing. Respective behaviors, F1 to F11, in FIG. 5 indicate the output power Pf against the distance D2 when another distance D1 varies from 600 μm to 800 μm with an interval of 20 μm. The output power of the LD 19 is set to be 5 mW.

The TOSA according to the present invention sets the distance D1 between the LD 19 and the lens 25 greater than the reference distance where the maximum optical coupling efficiency is given. For example, selecting the behavior F8, which corresponds to the distance D1 to be 740 μm greater than the reference distance, and sliding the stub 15 along the axis Ax, the optical axis of the TOSA, the target output power of 1 mW may be obtained. In the alignment process for the stub 15, namely, in the sliding of the stub 15 on the joint sleeve 17, the defocused amount may be reduced compared to those in the conventional TOSA. Accordingly, the power distribution at the end surface 15b of the stub 15 may be quite to get the TOSA with a superior wiggle tolerance.

In another condition where the output power of 0.5 mW is necessary at the end surface 15b of the stub 15, it may be realized that the first distance D1 between the LD 19 and the lens 25 is set between 600 μm to 800 μm and the stub 15 is slid along the axis Ax. Even when the distance D1 is enlarged to 800 μm, which is the largest case shown in FIG. 5 and corresponds to the behavior F11, the target output power of 0.5 mW may be achieved by sliding the stub 15 along the axis to the defocused position. However, according to the present TOSA, the defocused amount of the stub 15 may be reduced compared to the conventional TOSA. Accordingly, the optical power distribution at the end surface maybe uniformed to improve the wiggle tolerance.

Using a spherical lens with a diameter of 800 μm and a refractive index of 1.8, the condition where D1=600 μm, which corresponds to the behavior F1 in FIG. 5, and D2=1650 μm realizes the maximum optical coupling, in which a ratio, D2/D1, becomes 2.76. When the distance D1=800 μm greater than the former condition above, the maximum optical coupling efficiency may be obtained when the ratio, D2/D1, is substantially equal to unity, and the value of the optical coupling efficiency becomes smaller than the former condition where the distance D1 is equal to 600 μm. Accordingly, it may be preferable that the ratio, D2/D1, the distance between the lens 25 and the stub 15 to the distance between the LD 19 and the lens 25, is set greater than unity from the viewpoint of the optical coupling efficiency. To set the ratio, D2/D1, to be smaller than unity reduces the optical coupling efficiency to a value smaller than a practical level.

Figure 6:
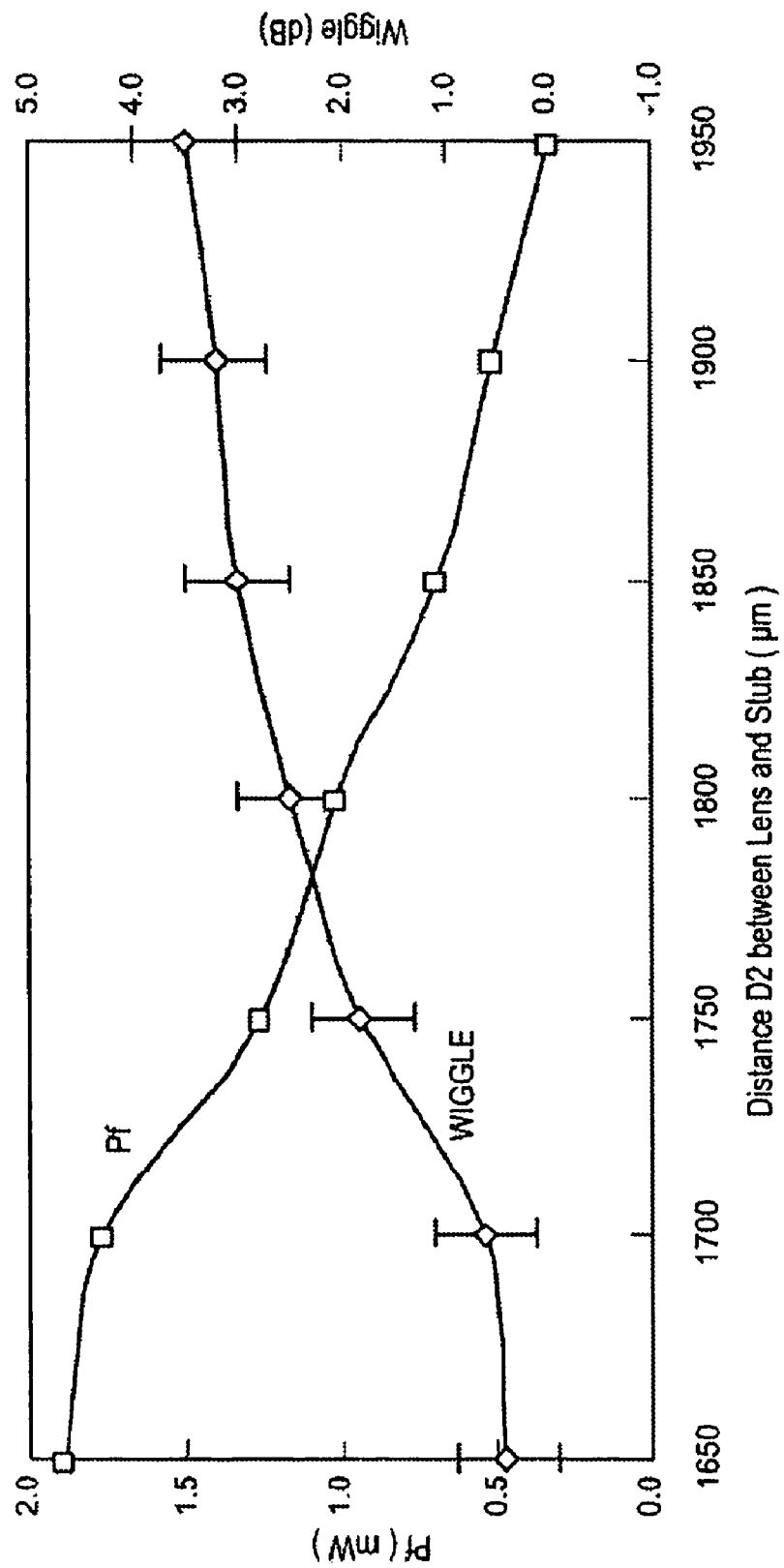
FIG. 6 shows a relation of the optical output power Pf and a wiggle characteristic to the distance D2.
Figure 7:
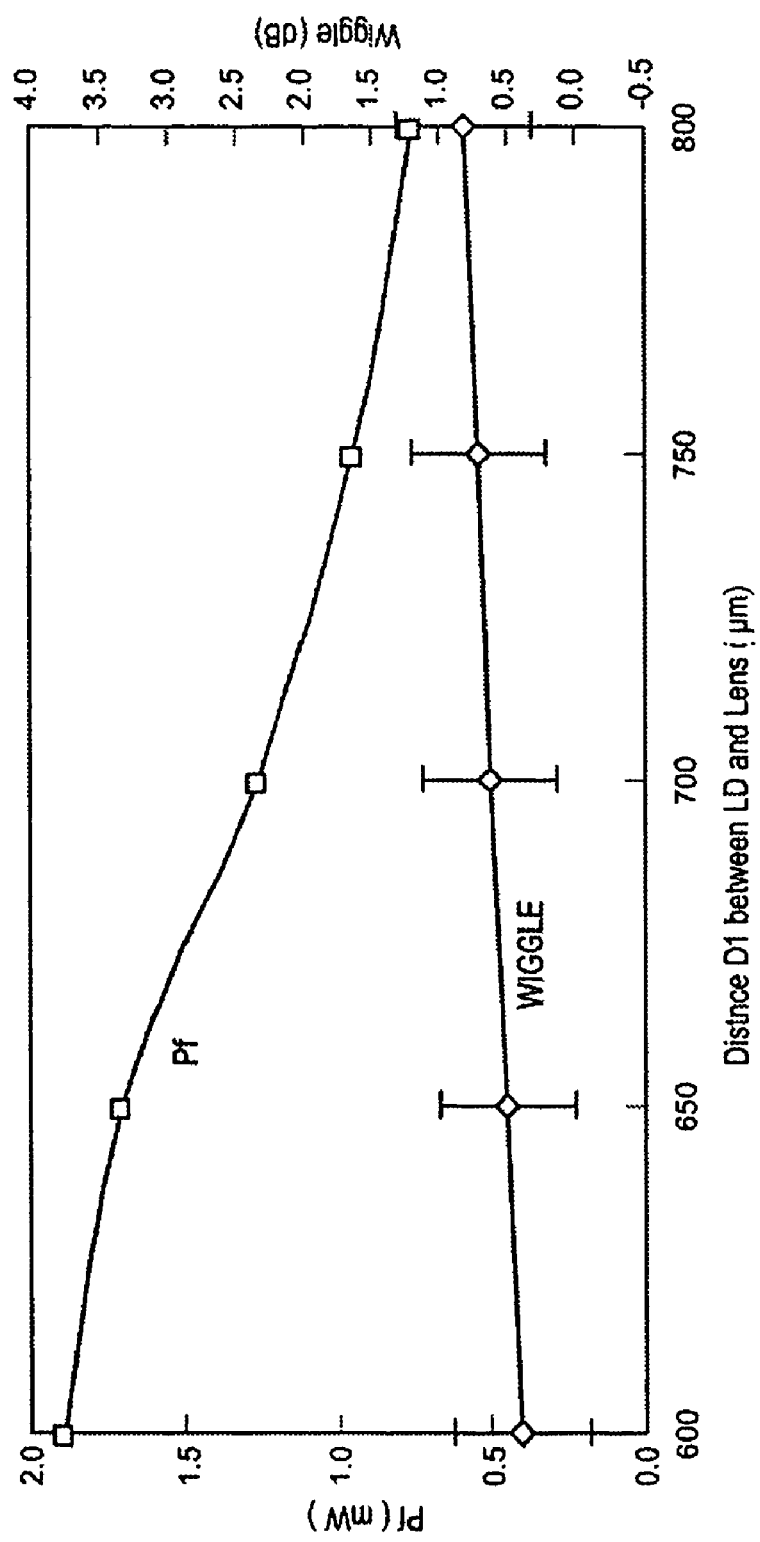
FIG. 7 shows a relation of the optical output power Pf and the wiggle characteristic to the distance D1.

FIG. 6 shows a relation of output power Pf and the wiggle tolerance WIGGLE against the distance D2. In FIGS. 6 and 7, the wiggle tolerance is determined by the following equation:

$$\text{WIGGLE}=10*\log(Pf_{min}/Pf_{max})[\text{dB}].$$

The experiment to get the minimum $Pf_{min}$ output power and the maximum output power $Pf_{max}$ is carried out by the following procedures: First, mating the optical connector with the optical receptacle, a weight of 500 g is suspended to the optical fiber near the optical connector. Second, rotating the TOSA by 360° around the optical fiber, the output power emitted from the optical fiber is measured and the maximum $Pf_{max}$ and the minimum $Pf_{min}$ of the power are evaluated. Generally, the wiggle tolerance is necessary to be below 1.0 dB. FIG. 6 is measured when the distance D1 is set to be 600 μm, which gives the maximum optical coupling efficiency. As shown in FIG. 6, the wiggle tolerance becomes larger as the distance D2 increases. Accordingly, the distance D2 between the lens 25 and the stub 15 is preferable to be short from the viewpoint of the wiggle tolerance.

FIG. 7 shows the maximum output power and the wiggle tolerance when the distance D1 is set to a value shown in the horizontal axis, which is greater than 600 μm where the maximum optical coupling efficiency is achieved, and the distance D2 is set to a value where the maximum optical coupling efficiency is obtained with respect to respective distances D1 in the horizontal axis. It is easily understood from FIG. 7 that the wiggle tolerance is left substantially constant to the distance D1, moreover, the wiggle tolerance may be kept small even in a region the maximum output power is small.

Figure 8:
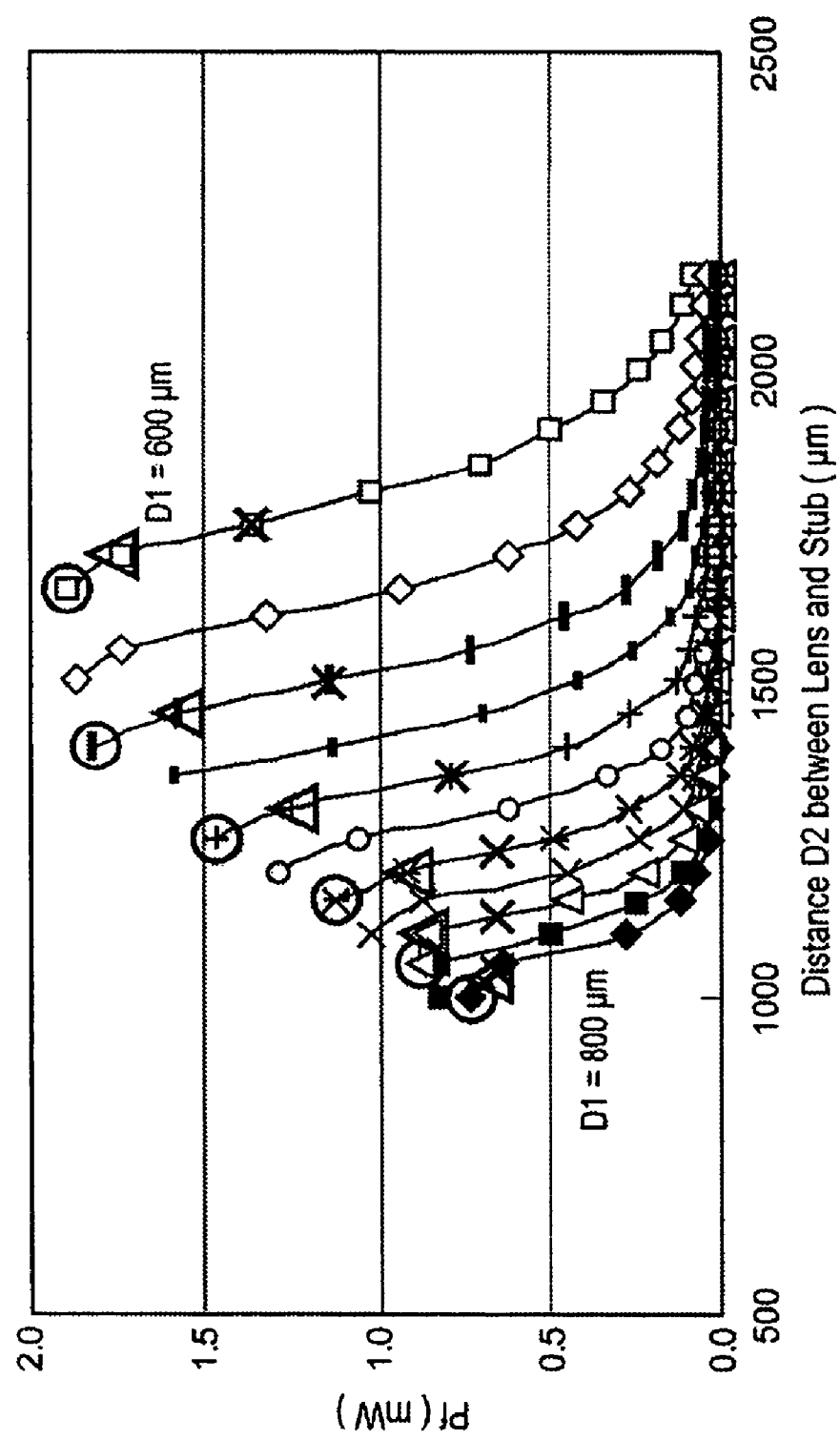
FIG. 8 superposes results in the wiggle characteristic on the relation between the optical output power Pf and the distances D1 and D2 shown in FIG. 5.

FIG. 8 overlaps symbols to behaviors of the output power shown in FIG. 6. That is, symbols ×, Δ and ○ mean poor, acceptable, and favorable, respectively. In the present invention, the distance between the LD 19 in the light-emitting facet thereof and the lens 25 is first set to a value greater than the reference distance where the maximum optical coupling efficiency is achieved. Next, the distance between the lens 25 and the stub 15 is set to a value where the present output power is realized and fixed thereto.

Second Embodiment

FIGS. from 9 to 11 show a process for manufacturing the TOSA described in the first embodiment. In the present embodiment, the lens 25 applies a spherical one.

Figure 9:
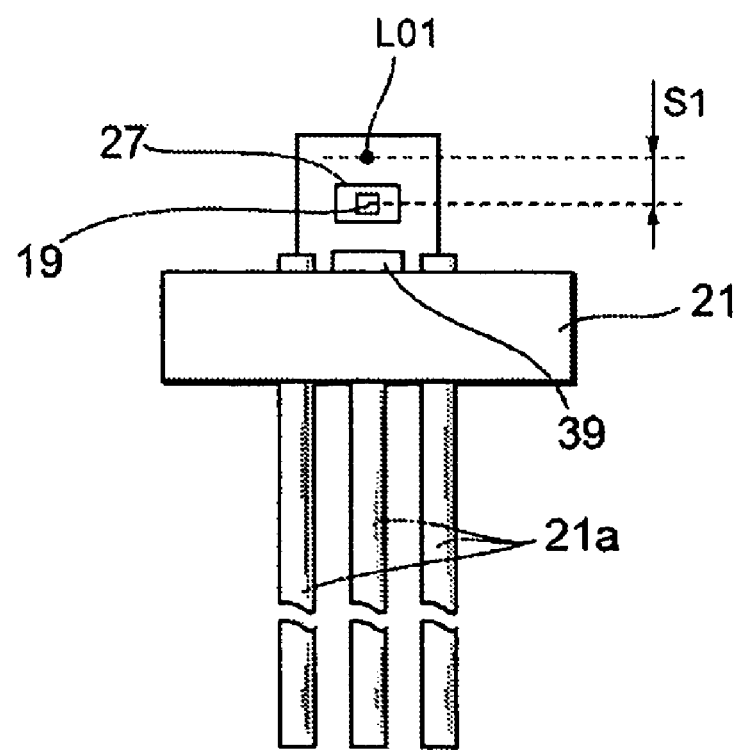
FIG. 9 shows a process for mounting the LD on the stem.

FIG. 9 shows a process for mounting the LD 19 within the optical device. In this process, the LD is mounted on the stem 21 by offsetting by the first distance S1 from the reference position L01. The distance between the LD and the lens 25 is greater than the focal length FP of the lens 25, which is shown in FIG. 1. As easily understood from the description above, the reference position L01 is a point where the maximum optical coupling is given for the distance D1 between the LD 19 and the lens 25, and the distance D2 between the lens 25 and stub 15. The first distance S1 is necessary to be greater than a value inherently attributed to the unevenness of the process for mounting the LD 19 on the stem 21, preferably, greater than 20 μm. This process also mounts the PD 39 on the stem 21. Subsequently, the wire bonding connects the LD 19 and the PD 39 in electrical to respective lead terminals 21a.

Figure 10:
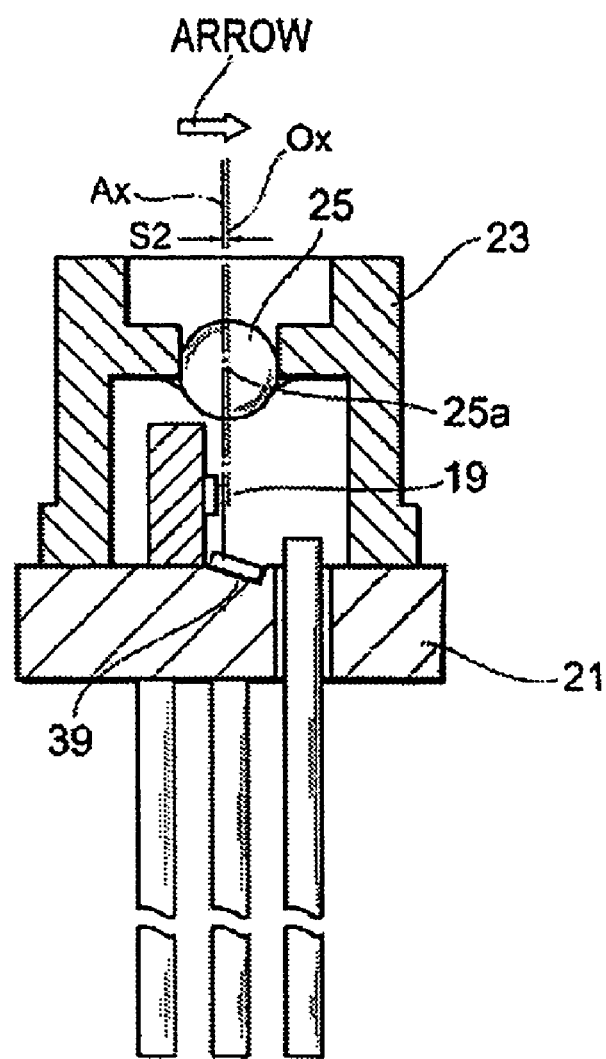
FIG. 10 shows a process for assembling the optical device.

FIG. 10 shows a process for manufacturing the optical device 13. After positioning the LD 19 on the stem 21, the optical device 13 is assembled by fixing the lens cap securing the lens 25 to the stem 21. The lens cap 23 is fixed to the stem 25 by offsetting to a direction shown by "ARROW" in FIG. 10 by a preset distance S2. The fixing may be carried out by the resistance welding between the lens cap 23 and the stem 21. In FIG. 10, the active layer of the LD 19 extends along the axis Ax, while, the center 25a of the lens 25 positions on the axis Ox parallel to the axis Ax. The second distance S2 is preferably greater than a value inherently attributed to the unevenness of the manufacturing process, preferably, greater than 20 μm, still further preferably greater than 60 μm. By fixing the lens cap 23 on the stem 21, the distance between the LD 19 and the lens 25 may be automatically determined. In the TOSA 11 according to the present invention, as shown in FIG. 9, the position where the LD 19 is mounted on the stem 21 is set apart from the lens, namely, apart from the reference position L01 where the maximum optical coupling efficiency between the LD 19 and the lens 25 is given. Accordingly, the distance D1 between the LD 19 and the lens 25 becomes greater than the reference distance.

Figure 11:
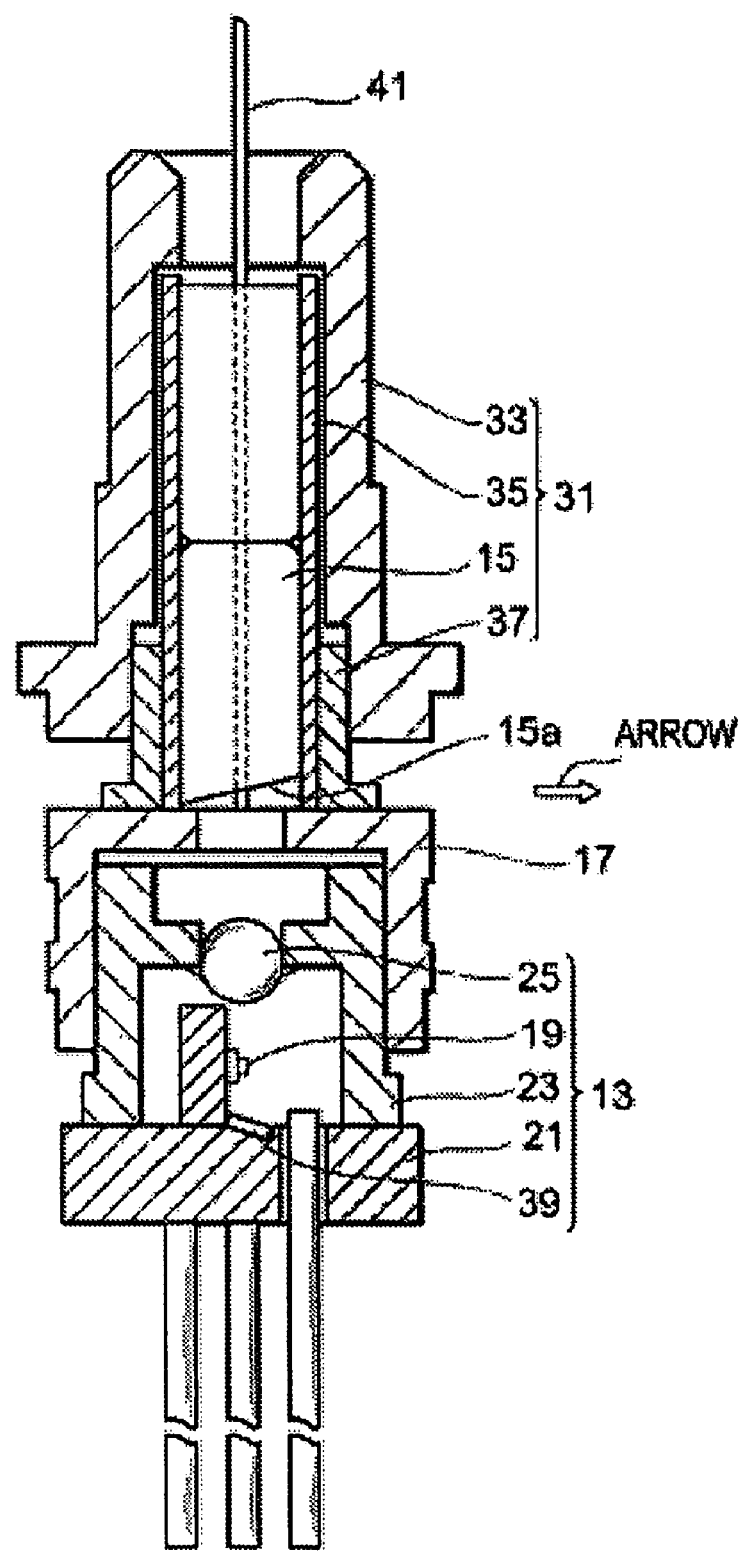
FIG. 11 shows a process for assembling the optical device with the optical receptacle.

FIG. 11 shows a process where the optical receptacle 31 is assembled with the optical device 13 via the joint sleeve 17. First, the optical receptacle 31 is rotated on the joint sleeve 17 such that the inclined end surface 15a of the stub 15 directs a preset direction, the direction shown by "ARROW" in FIG. 11, which is identical with the direction "ARROW" in FIG. 10. Next, as monitoring the output power emitted from the end of the monitor tool 41 that couples with the stub 15, the optical receptacle 31 is slid on the joint sleeve 17 along two directions perpendicular to the optical axis to determine a position where the maximum output power is obtained. Finally, the joint sleeve 17 is slid on the outer surface of the lens cap 23 along the optical axis to adjust the distance between the lens 25 and the stub 15 such that the output power obtained through the monitor tool 41 becomes a predetermined value.

In order to reduce the power fluctuation at the end surface of the stub, it is preferable to decrease the defocused amount of the stub against the lens. It may be assumed that, when the defocused amount is reduced, the output power exceeds a specific magnitude. In the optical configuration according to the present invention, the distance D1 between the LD and the lens is set to be a value greater than the reference distance where the maximum optical coupling efficiency is achieved. Accordingly, the defocused amount may be reduced to satisfy the specified output power by adjusting the distance D2 between the lens and the stub. Moreover, the power fluctuation appeared in the light beam may be also decreased. Thus, the unevenness in the power distribution at the end surface of the stub can be reduced, which enhances the wiggle tolerance.

While the invention has been disclosed in connection with the preferred embodiments shown and described, various modifications and improvements thereon will become readily apparent to those skilled in the art. Accordingly, the spirit and scope of the present invention is to be limited only by the following claims.

What is claimed is:

1. An optical subassembly mating with an optical connector that is attached to a tip of an optical fiber, comprising:
    an optical receptacle securing a stub optically coupled with the optical connector, the stub providing a coupling fiber in a center portion thereof;
    an optical device including a semiconductor optical device, a stem for mounting the semiconductor optical device, and a lens cap assembled with the stem, the lens cap securing a lens to couple the semiconductor optical device with the coupling fiber; and
    a joint sleeve for aligning the optical receptacle with the optical device,
    wherein a distance between the semiconductor optical device and the lens is greater than a focal length of the lens and a reference distance where a maximum coupling efficiency between the semiconductor optical device and the lens is achieved such that a defocused distance between the coupling fiber and the lens is shorter than a distance when the semiconductor optical device is set in the reference distance to get a predetermined optical output power from the optical subassembly.

2. The optical subassembly according to claim 1,
wherein a ratio of the distance between the semiconductor optical device and the lens to the defocused distance between the lens and the coupling fiber is greater than unity.

3. The optical subassembly according to claim 1,
wherein the semiconductor optical device is positioned with respect to the lens at least 20 μm greater than the reference distance.

4. The optical subassembly according to claim 1,
the semiconductor optical device is a semiconductor laser diode.

5. The optical subassembly according to claim 1,
wherein the lens is a spherical lens,
wherein the semiconductor optical device is a semiconductor laser diode having an active layer extending along a first virtual plane in parallel to an optical axis of the coupling fiber,
wherein a center of the lens positions between the first virtual plane and a second virtual plane including the optical axis of the coupling fiber and extends in parallel to the first virtual plane, and
wherein an end surface of the stub with an end surface of the coupling fiber facing the lens is inclined to a direction from the first virtual plane to the second virtual plane.

6. The optical subassembly according to claim 5,
wherein an angle of the inclined surface to the optical axis is greater than 5° and smaller than 9°.

7. A method for manufacturing an optical subassembly that provides an optical receptacle for receiving an optical connector, an optical device, and a joint sleeve for aligning the optical receptacle to the optical device, the optical receptacle including a stub with a coupling fiber in a center portion thereof for coupling the optical connector with the optical device, the optical device including a semiconductor laser diode with an active layer, a stem and a lens cap, the stem mounting the semiconductor laser diode thereon, the lens cap being assembled with the stem and securing a spherical lens, the coupling fiber having an end surface facing the spherical lens inclined with respect to an optical axis of the coupling fiber, the method comprising steps of:

(a) mounting the semiconductor laser diode in a position on the stem offset from a position where a maximum optical coupling between the semiconductor laser diode and the spherical lens is obtained;

(b) assembling the lens cap with the stem and offsetting a center of the spherical lens from a virtual plane including the active layer;

(c) aligning the optical receptacle with the optical device along two directions perpendicular to an optical axis of the coupling fiber, and aligning the inclined end surface of the coupling fiber to a direction at which the spherical lens is offset from the virtual plane by rotating the optical receptacle on the joint sleeve; and (d) aligning the optical receptacle with the optical device in a direction parallel to the optical axis of the coupling fiber by sliding the joint sleeve on the spherical lens cap such that an optical output power emitted from an end surface of the coupling fiber opposite to a surface facing the spherical lens becomes a preset power.

8. The method according to claim 7,
wherein the distance between the semiconductor laser diode and the spherical lens is greater than a focal length of the spherical lens.

9. The method according to claim 7,
wherein the step (b) includes a step for offsetting the center of the lens is by at least 20 μm.

10. A transmitting optical subassembly (TOSA) mating with an optical connector attached in a tip of an optical fiber, comprising:
a semiconductor laser diode for emitting light;
a lens for focusing the light; and
a stub with a coupling fiber in a center portion thereof for receiving the focused light,
wherein a distance between the semiconductor laser diode and the lens is set greater than a reference distance at which a maximum optical coupling efficiency between the semiconductor laser diode and the lens is achieved such that a defocused distance between the lens and the coupling fiber is shorter than a distance when the semiconductor laser diode is set in the reference distance to get a predetermined optical output power form the optical fiber, and
wherein a ratio of a maximum optical output power to a minimum optical output power monitored by the optical fiber is smaller than 1 dB when the transmitting optical subassembly is rotated around an optical axis of the transmitting optical subassembly as the optical fiber being suspended with a weight of 500 g near the optical connector.

11. The transmitting optical subassembly according to claim 10,
wherein the distance between the semiconductor laser diode and the lens is greater than a focal length of the lens.

12. The transmitting optical subassembly according to claim 10,
wherein the distance between the semiconductor laser diode and the lens is at least 20 μm greater than the reference distance.

13. The transmitting optical subassembly according to claim 10,
wherein the semiconductor laser diode provides an active layer extending in a virtual plane and the lens has a center offset from the virtual plane, and
wherein the coupling fiber is offset from the center of the lens to the same direction with the offset of the lens to the active layer of the semiconductor laser diode.

14. The transmitting optical subassembly according to claim 13,
wherein the stub has an end surface facing the lens and being inclined with respect to the optical axis to the same direction with the offset of the lens to the active layer of the semiconductor laser diode.

15. The transmitting optical subassembly according to claim 14,
wherein the angle of the inclined surface of the stub is greater than 5° and smaller than 9°.

16. An optical subassembly mating with an optical connector that is attached to a tip of an optical fiber, comprising:
an optical receptacle securing a stub optically coupled with the optical connector, the stub providing a coupling fiber in a center portion thereof;
an optical device including a semiconductor optical device, a stem for mounting the semiconductor optical device, and a lens cap assembled with the stem, the lens cap securing a lens to couple the semiconductor optical device with the coupling fiber; and a joint sleeve for aligning the optical receptacle with the optical device, wherein a distance between the semiconductor optical device and the lens is greater than a focal length of the lens and a reference distance where a maximum coupling efficiency between the semiconductor optical device and the lens is achieved, and wherein a distance between the lens and the coupling fiber is set at a point where a maximum optical coupling efficiency between the lens and the coupling fiber is achieved.

17. The optical subassembly according to claim 16, wherein a ratio of the distance between the semiconductor optical device and the lens to the distance between the lens and the coupling fiber is greater than unity.

* * * * *